Feb. 21, 1967 F. M. SLOAN ET AL 3,304,890
ELECTRICALLY HEATED ICE CREAM SCOOP
Filed Sept. 18, 1964
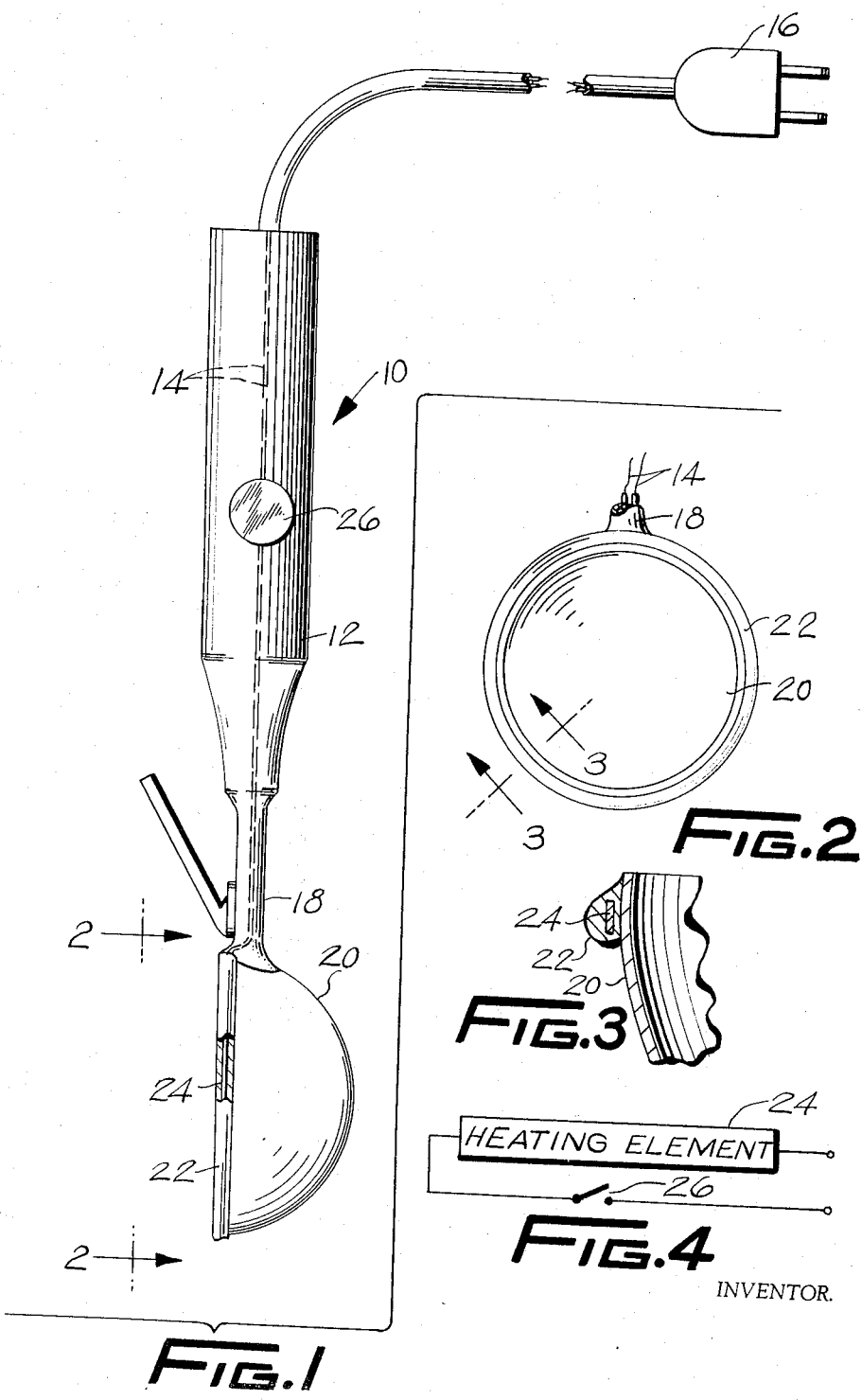
INVENTOR.

United States Patent Office 3,304,890
Patented Feb. 21, 1967

3,304,890
ELECTRICALLY HEATED ICE CREAM SCOOP
Flora M. Sloan and Howard J. Sloan, both of
P.O. Box 1402, Glendale, Calif. 91209
Filed Sept. 18, 1964, Ser. No. 397,410
3 Claims. (Cl. 107—48)

This invention relates to hand tools, and more particularly to an electrically heated ice cream scoop.

It is an object of the present invention to provide an electric ice cream scoop which will scoop ice cream and will immediately deposit the ice cream in a container or upon a cone in a minimum amount of time with a minimum amount of effort.

Another object of the present invention is to provide an electric ice cream scoop which will have a heating element encased within an annular bead secured to the cup portion of the scoop to provide a means for heating the cup to prevent sticking of the ice cream within the scoop.

A further object of the present invention is to provide an ice cream scoop which will have push button switch means in the handle to control the heat while using the electric ice cream scoop.

Other objects of the invention are to provide an electric ice cream scoop bearing the above objects in mind which is of simple construction, has a minimum amount of parts, is inexpensive to manufacture and efficient in operation and use.

For other objects and for a better understanding of the invention, reference may be had to the following detailed description taken in conjunction with the accompanying drawing, in which:

FIGURE 1 is a side elevational view of the present invention;

FIGURE 2 is a fragmentary and sectional view of the cup member shown in FIGURE 1;

FIGURE 3 is a cross sectional view taken along the lines 3—3 of FIGURE 2; and

FIGURE 4 is a schematic wiring diagram of the invention.

Referring now more in detail to the drawing, an electric ice cream scoop 10 made in accordance with the present invention is shown to include a hollow elongated insulated handle 12 of cylindrical configuration which receives a pair of insulated electric wires 14 which extend from the handle and are terminated by a male plug 16 providing a means for plugging ice cream scoop 10 into an electric outlet receptacle. Handle 12 is provided with a hollow shank 18 which also receives wires 14 and shank 18 is fixedly secured to a cup member 20 of hemi-spherical hollow configuration. As can be seen in FIG. 1, shank 18 tapers into cup member 20 at one end and tapers into handle 12 at its other end to provide maximum structural strength. Cup member 20 provides a means for scooping and depositing ice cream. An annular electric heating element 24 is embodied within an annular bead 22 of hard insulating material secured to the outer surface of cup member 20 closely adjacent the rim thereof. Heating element 24 forms the core of bead 22. The bead 22 is of teardrop cross-sectional configuration (see FIG. 3) with the narrow edge thereof extending toward the rim of the cup member 20. The bead 22 is secured to the outer surface of the rim of the cup by a suitable non-toxic adhesive. As can be seen in FIG. 3, of the drawing, the outer surface of the insulating bead 22 and the outer surface of cup member 20 not covered by bead 22 are exposed. The heating element 24 is electrically connected in circuit with wires 14 which extend through handle 12 and shank 18. A push button switch 26 provides means for opening and closing the electrical circuit to heating element 24. Switch 26 is carried by handle 12 and is electrically connected in series with heating element 24. The switch opens and closes the circuit from plug 16 through wires 14 to heating element 24.

In use, the operator grasps the handle 12 in the well known manner and scoops ice cream with the cup member 20, and while gripping handle 12, switch 26 is depressed to close the series circuit of ice cream scoop 10 which causes heating element 24 to heat the cup 20, whereupon the ice cream is scooped into cup 20 and is quickly and immediately deposited into a container or cone.

It shall be noted that wires 14 are insulated from each other within handle 12 and its associated shank 18, thus preventing any shock hazard.

While various changes may be made in the detail construction, it shall be understood that such changes shall be within the spirit and scope of the present invention as defined by the appended claims.

What we claim as new and desire to protect by Letters Patent of the United States is:

1. An electric ice cream scoop comprising, in combination, an insulated handle member, a hemi-spherical hollow cup member carried by one end of said handle member, providing a means for scooping and depositing ice cream, an annular electrical heating element embodied within an annular insulating bead carried by said cup member providing a means for electrically heating said cup member to immediately release said ice cream from said cup, electrical circuit means extending through said handle for electrically connecting said heating element to a source of power, a push button switch carried by said handle member providing means for opening and closing said electrical circuit means from said power source to said electrical heating element, said handle member being hollow and being provided with a hollow shank, said electrical circuit means comprising a pair of insulated wires extending through the hollow handle and handle shank and electrically connected at one end to said heating element and at the other end to external cord and plug means extending rearwardly of said handle member to provide means for connecting said electric heating element to a receptacle to provide current for said ice cream scoop, said bead being made of a hard insulating material and being secured to the outer surface of said cup member closely adjacent the rim thereof and said heating element forming the core of said bead, said bead being of teardrop cross-sectional configuration with the narrow edge thereof extending toward the rim of said cup member and being secured by a suitable non-toxic adhesive to the outer surface of the rim of said cup, and the outer surface of the insulating bead and the outer surface of the cup member not covered by the bead being exposed.

2. The combination according to claim 1 wherein said push button switch is received within said handle member of said device and when said handle is gripped, said switch is automatically depressed to close the series circuit carried within said device which will cause said heating element to heat said cup member to immediately free the ice cream from within said cup member in order that it may be received within a container or upon an ice cream cone.

3. The combination according to claim 2 wherein said shank of said ice cream scoop tapers into said cup member of said ice cream scoop at one end and tapers into one end of said handle to provide a maximum of structural strength for said ice cream scoop to prevent bending when ice cream is scooped into said cup member of said electric ice cream scoop.

References Cited by the Examiner
UNITED STATES PATENTS 1,974,051   9/1934   Kelly _____ 219—228 X
2,256,770   9/1941   Armstrong _____ 219—228 X ANTHONY BARTIS, *Primary Examiner.*